(12) United States Patent
Cutler

(10) Patent No.: US 7,589,595 B2
(45) Date of Patent: Sep. 15, 2009

(54) DISTRIBUTING FREQUENCY REFERENCES

(75) Inventor: Robert T. Cutler, Everett, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 40 days.

(21) Appl. No.: 11/465,577

(22) Filed: Aug. 18, 2006

(65) Prior Publication Data

US 2008/0068103 A1 Mar. 20, 2008

(51) Int. Cl.
*H03L 7/06* (2006.01)
*H03B 5/32* (2006.01)

(52) U.S. Cl. ................ 331/18; 331/158; 331/177 R

(58) Field of Classification Search ............. 331/18, 331/30, 36 C, 44, 96, 116 R, 116 FE, 116 M, 331/108 D, 154, 156, 158, 172, 175, 177 R; 368/46, 47; 375/359, 362
See application file for complete search history.

(56) References Cited

U.S. PATENT DOCUMENTS

| 4,525,685 | A |   | 6/1985  | Hesselberth et al. |
|-----------|---|---|---------|--------------------|
| 4,728,906 | A | * | 3/1988  | Turl et al. ................ 331/4 |
| 4,871,983 | A | * | 10/1989 | Graycar ................ 331/96 |
| 5,274,545 | A |   | 12/1993 | Allan et al. |
| 5,293,374 | A |   | 3/1994  | Eidson |
| 5,392,005 | A | * | 2/1995  | Bortolini et al. ........ 331/44 |
| 5,940,027 | A | * | 8/1999  | Forseth et al. ........ 342/357.06 |
| 6,178,215 | B1 | * | 1/2001  | Zhang et al. ........ 375/371 |
| 6,472,943 | B1 | * | 10/2002 | Soong et al. ........ 331/44 |

| 2004/0085142 | A1 | * | 5/2004 | Senthilkumar et al. ..... 331/36 C |

OTHER PUBLICATIONS

Hewlett Packard Company—"The Best Value In High Performance Crystal Oscillators"—HP 10811D/10811E Crystal Oscillators; Copyright 1991, 5091-1639E; pp. 1-4. (Products/Services now available through Agilent Technologies, Inc.—www.agilent.com/find/products).
Hewlett Packard Company—"Operating & Service Manual—10811A/B Quartz Crystal Oscillator"; First Edition—Aug. 1980; Copyright 1980; Manual Part No. 10811-90002, Microfiche Part No. 10811-90003; pp. 1-0-8-23.
IEEE Std 1588 TM—2002; 1588 TM—"IEEE Standard For A Precision Clock Synchronization Protocol For Networked Measurement And Control Systems"; IEEE Instrumentation and Measurement Society; Approved Sep. 12, 2002—IEEE-SA Standards Board; pp. 1-143.

* cited by examiner

*Primary Examiner*—Robert Pascal
*Assistant Examiner*—Ryan J. Johnson

(57) ABSTRACT

A correction processor connected to an oscillator uses precision timing signals propagated over a digital network to generate an error signal. IEEE-1588 time synchronization protocols produce precision time signals which are converted to precision interval signals. The correction processor uses the precision interval signals to count pulses of the oscillator. A correction circuit compares the counter output with a predetermined value and generates an error signal may be used to correct the oscillator or may be propagated to consumers of the oscillator. An arbitrary reference oscillator may be used to generate the precision timing signals propagated on the network, to slave other oscillators to it. The precision of the reference oscillator may be deliberately overstated to insure it is used as a master.

16 Claims, 4 Drawing Sheets

DISTRIBUTING FREQUENCY REFERENCES

TECHNICAL FIELD

Embodiments in accordance with the invention are related to frequency references, and more particularly, to distributing frequency reference information among devices in a test or production environment, such as among test instruments, or between test instruments and a device under test.

BACKGROUND

Many laboratory and manufacturing test environments use a variety of electronic test and measurement equipment, including for example, signal generation and measurement instruments. In any situation where multiple instruments are used, the question of accuracy arises. If a signal generator is programmed to generate a signal at 146.115 MHz, and a frequency counter measures that frequency at 146115003.7 Hz, which instrument is more accurate? When the frequency counter reports 146115006.2 Hz a few hours later, which instrument has changed?

Signal generation and measurement instruments generate and measure signals with respect to an internal oscillator, a reference, commonly a signal source of 10 MHz. With multiple instruments each having their own internal oscillator or timebase, instantaneous differences in frequency, as well as drifting differences over time are inevitable.

One approach to solving this problem is to use more stable oscillators in equipment. Companies such as Agilent Technologies offer precision timebases as an option on many products. These timebases, typically a double-oven temperature controlled crystal oscillator, greatly increase the accuracy and stability of an instrument, as well as increasing the instrument's price, weight, heat generation, and power consumption; for best performance, these timebases must be powered continuously. And with a suite of instruments each with its own precision oscillator, issues of differences between instruments have been pushed over a few decimal places, but are still present.

Another approach to the problem is to drive instruments from a common oscillator. This approach makes the fundamental assumption that all instruments are able to use the same reference frequency. This common reference frequency may be generated by one instrument, as an example, a master instrument with an upgraded timebase oscillator, or an external reference such as a GPS-synchronized reference oscillator, a rubidium standard, or other "house" standard. The reference signal must be distributed to each instrument. This means each instrument requires yet another signal connector (typically a rear-panel BNC), which adds cost and takes up space. Yet another cable must be run from each instrument to a distribution point, further adding to the rat's nest of cables. To maintain spectral purity and low phase noise, special distribution amplifiers must be used. Additional cabling between instruments can introduce ground loops and other undesirable signals which can make complex test and measurement environments even more complex.

Instruments in a test environment are often required to use reference signals from a device under test (DUT) such as a cellular base station (BTS). When an instrument is required to "lock on" to such a nonstandard reference using reference signals, that instrument can then serve as a master for other instruments in the test suite.

SUMMARY OF THE INVENTION

An oscillator is synchronized to an external reference through the use of timing synchronization information provided over a computer network. Precision time references distributed across a computer network, such as provided by the IEEE 1588-2002 standard, provide precise time and interval data. In one embodiment, precision interval information is used to adjust the frequency of an oscillator. In another embodiment, precision interval information is used to determine the error of an oscillator in an instrument; the determined error is used to correct instrument operation. In a third embodiment, an arbitrary frequency reference is distributed over a network by converting frequency information to interval information and distributing the interval information over the network. The interval information may deliberately overstate its precision. Other instruments using this distributed interval information to adjust their local reference clocks will reproduce the arbitrary reference, including frequency drifts and other errors in the arbitrary reference.

BRIEF DESCRIPTION OF THE INVENTION

DETAILED DESCRIPTION OF THE EMBODIMENTS

Many frequency generating and measuring instruments make use of a reference oscillator. In many applications, such as in complex laboratory or test environments, it is desirable to synchronize many instruments to a common standard.

Computer networks, particularly Ethernet networks, have become ubiquitous, even in the test and measurement environment.

The IEEE-1588(TM)-2002 standard, hereinafter 1588 and incorporated by reference, provides a precision clock synchronization protocol for networked measurement and control systems. By implementing the standard, in particular by implementing the standard as it applies to Ethernet networks, clocks in multiple instruments on a network may be synchronized to a time source, known in 1588 terminology as a boundary, master, or grandmaster clock. Synchronization is obtained through the use of the Precision Time Protocol (PTP) defined by 1588. Packets defined by the standard are exchanged between instruments to achieve time synchronization. While the present invention describes implementations in terms of Ethernet networks, it should be noted that IEEE-1588 supports any network protocol with multicast messaging.

Figure 1:
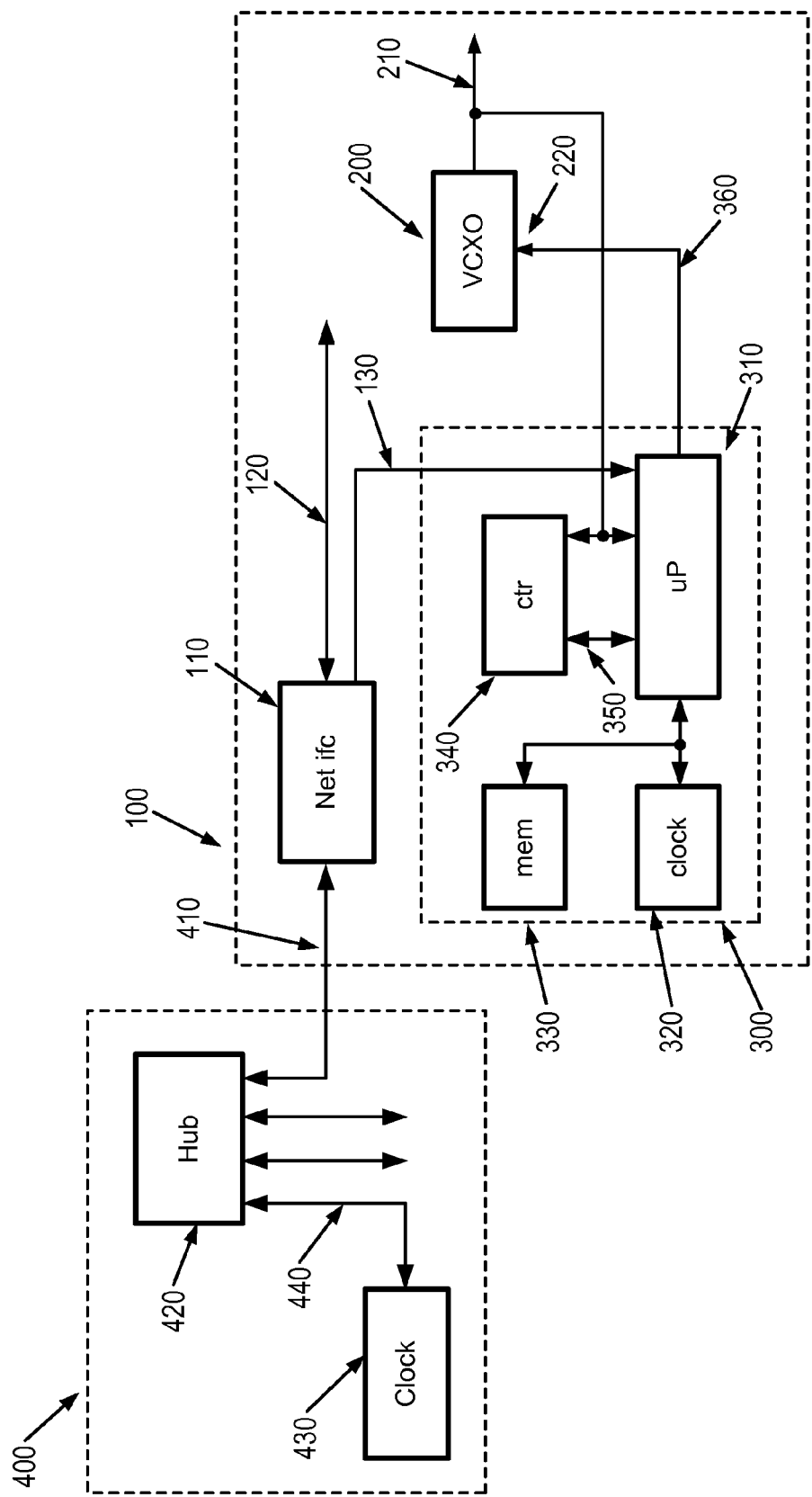
FIG. 1 shows a first block diagram of a network aware oscillator.

FIG. 1 shows a block diagram of a network aware oscillator according to a first embodiment of the present invention. Network aware oscillator 100 connects 410 to network 400 through 1588-enabled network hub 420. Hub 420 may be any 1588-compliant hub, switch, or router; suitable switches and routers are available from companies such as Hirschmann Electronics and OnTime Networks. In the example shown, boundary clock 430 provides time synchronization services 440 according to the 1588 standard. OnTime Networks also produces 1588 boundary clocks, including GPS time synchronization.

Within network aware oscillator 100, network interface 110 provides network services 120 to clients within the instrument. Network interface 110 also provides, in coordination with 1588 messages, precision timing signal 130. For the present embodiment, precision timing signal 130 is in the nature of pulses at a predetermined interval, such as one pulse per second, or one pulse every two seconds. One such client is correction processor 300. It should be noted that part of the 1588 standard includes additional timing signals as part of network services 120, allowing synchronization without the delays and variations introduced by protocol stacks and operating system interactions.

The 1588 standard is a time synchronization standard. Using the Precision Time Protocol defined by the 1588 standard, processor 310 in correction processor 300 maintains the synchronization of its clock 320 with similar clocks in instruments attached to hub 420. In the embodiment shown, the time is set by clock 430. Timing parameters are stored in memory 330.

Also present in instrument 100 is oscillator 200. Oscillator 200 produces output signal 210 which is used by the instrument. In one example, this is a 10 MHz signal. Output signal 210 is also passed to correction processor 300, and within the correction processor, to counter 150 and processor 310. Control lines 350 allow processor 310 to reset, enable, and read the contents of counter 340. Counter 340 is typically 32 bits wide or wider, so that processor 310 may count long periods of oscillator 200. A 48-bit wide counter 340 allows for counting periods of many days at 10 MHz. Prescaling may also be used ahead of counter 340.

In the network aware oscillator of FIG. 1, a voltage-controlled oscillator is used for oscillator 200. Such an oscillator has an input which allows its operating frequency to be adjusted. As an example, the Agilent 10811 and 10544 series crystal oscillators are oven-stabilized devices which provide a 10 MHz output. The electronic frequency control (EFC) input on these devices allows an output frequency adjustment of 1 Hz over a +/−5V control range. Alternate embodiments of oscillator 200 may use any suitable oscillator topology, although crystal oscillators are preferred. Placing a variable capacitance (varactor) diode in the oscillator feedback loop allows for electronic frequency control (EFC) and the ability to change the oscillator frequency, even of a crystal oscillator, slightly. An analog EFC input is typically fed by a digital to analog converter. Other electrically tunable oscillators may also be used, such as dielectric resonant oscillators (DRO) or ytterbium-iron-garnet tuned oscillators (YTO) common in very high frequency systems.

In operation according to the present invention, processor 310 responding to PTP requests through network 400 establishes precision time intervals according to an external reference. By counting 340 suitable periods of oscillator 200 output 210, processor 310 develops an error indication 360 and used this error indication to adjust electronic frequency control 220 of oscillator 200 to trim its operating frequency and phase.

Figure 2:
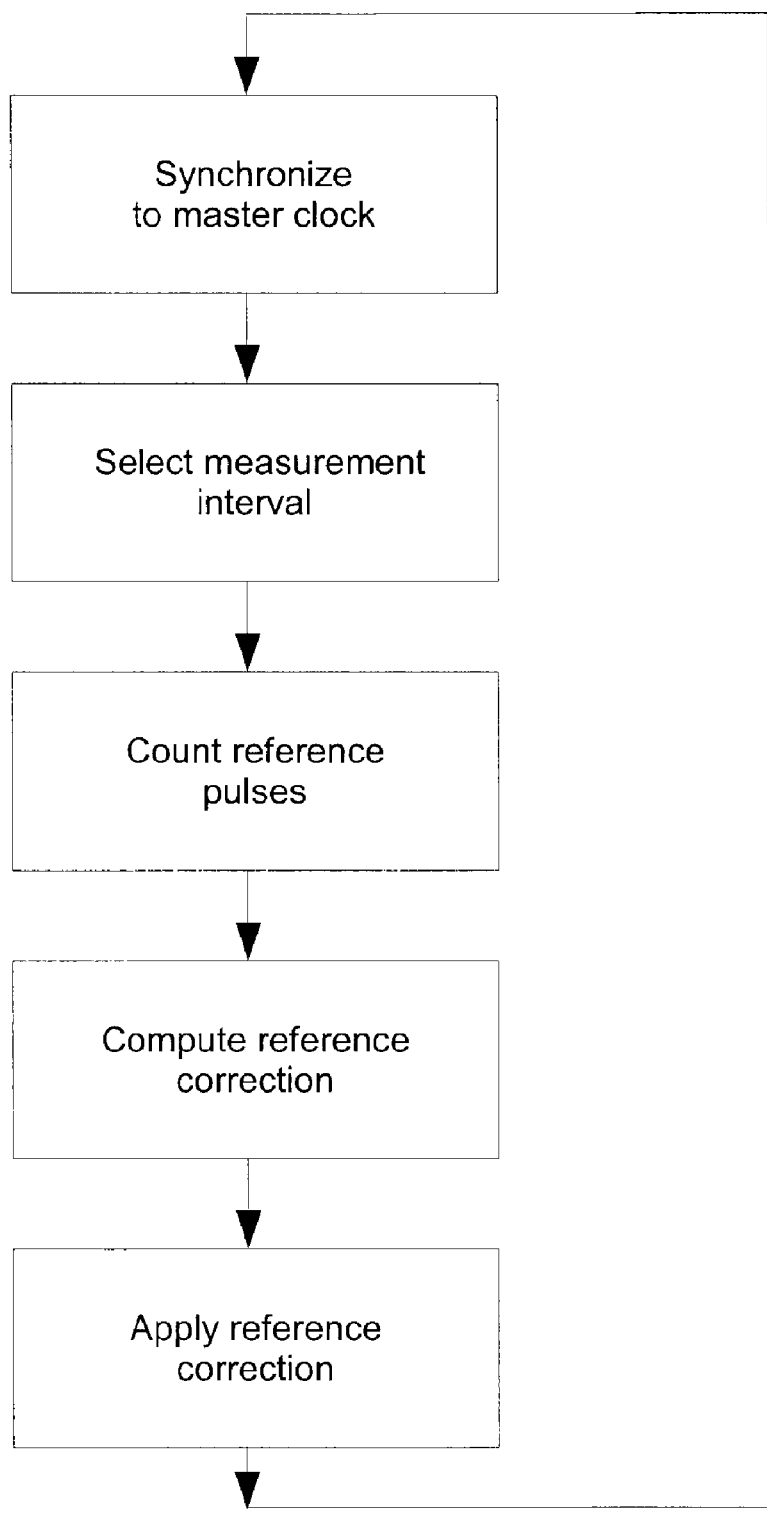
FIG. 2 shows a flowchart of frequency correction.

According to the 1588 specification, all systems on a network containing clocks may participate in selecting a master clock. This selection is performed using the 1588 PTP protocols and allows systems receiving PTP Sync messages to select the best master clock, and is described in section 6.1.2 Operation Overview of the 1588 Specification. When a master clock is identified, it sends out periodic Sync messages which allow other systems, known in 1588 as slave clocks, to synchronize their clocks to the master clock. This synchronization process is described in section 7.8 of the 1588 Specification The application and adaptation of this process to the present invention is shown in the flowchart of FIG. 2 Referring also to FIG. 1, in this embodiment correction processor 300 synchronizes its local clock 320 with a master clock, boundary clock 430 in the embodiment shown. This synchronization is maintained through periodic PTP messages passed 120 through network interface 110.

According to the present invention, correction processor 300 selects a measurement interval for counting pulses from oscillator 200. As an example, assume an interval of 100 seconds is used.

Using 1588 timing information provided 120 by network interface 110, pulses from oscillator 200 are counted for the selected measurement interval.

Next, the reference correction is calculated. Assume for example that the measurement interval is 100 seconds with an uncertainty of 200 nanoseconds (ns). For this interval, the expected number of pulses from oscillator 200 would be the frequency times the interval plus or minus the number of counts in the uncertainty. For the example given, with an interval of 100 seconds and a reference oscillator frequency of 10 MHz, the expected number of counts would be in the range 100 times 10 million, plus or minus 2 counts. If the actual number of pulses counted during the measurement interval is higher than the calculated range, oscillator 200 is running fast. If the actual number of pulses counted during the measurement interval is lower than the calculated range, oscillator 200 is running slow. This error indication is generated as signal 360.

If a correction is needed, it may be calculated using any number of models. The system represented by oscillator 200 with electronic frequency control 220 and correction processor 300 forms a control loop, and standard analytical tools may be employed for example to insure a suitably damped response. The correction based on error indication 360 is calculated and passed to electronic frequency control input 220 of oscillator 200, altering its operating frequency.

As shown in the flowchart of FIG. 2, the process continues, both in terms of maintaining clock synchronization, and of correcting oscillator 200. The longer the measurement interval, the closer the synchronization between oscillator 200 and the master clock, at a cost of slower response to change. In the example shown, using measurement intervals of 100 seconds and measurement uncertainties on the order of 200 nanoseconds, synchronization on the order of one part in ten to the eighth may be achieved. It should be noted that this high degree of synchronization is achieved without needing any knowledge of the operating frequencies of the clocks or oscillators involved.

In correcting the frequency of oscillator 200, the first-order correction is of operating frequency and phase. Correction information is stored in memory 330. By collecting measurement and correction information over longer periods of time, hours to days, second order effects such as aging in a temperature-stabilized crystal oscillator may be modeled and corrected.

In implementing the present invention, network interface 110 and correction processor 300 comprising processor 310, clock 320, memory 330, and counter 340 may be a portion of network aware oscillator 100, or they may be part of a larger instrument in which the reference is embedded. Network aware oscillator 100 could be offered as a stand-alone device, or as an option in instruments.

In a second embodiment of the invention as shown in Fig, 3, precision interval information is delivered 130 to correction processor 300. Correction processor 300 counts periods of oscillator 200 as defined by precision interval signal 130. Where the first embodiment of the invention developed correction information used to directly adjust the frequency of the oscillator, in this embodiment correction information 360 is produced and propagated to the instrument to correct for errors in the frequency of oscillator 200.

In the case of a frequency measuring instrument such as a counter, correction data 360 may be used digitally to correct measurements. As an example, assume a frequency counter with a nominal timebase of 10 MHz measures 154904876 cycles in a one second interval, the interval defined as 10,000,000 cycles of the timebase oscillator. If correction data 360 indicates the 10 MHz oscillator is 8 cycles per second slow, operating at 9999992 Hz rather than 10 MHz, the measured data may be corrected and reported or displayed as 154905000 Hz rather than 154904876 Hz. In the case of a signal generating instrument such as a frequency synthesizer, device operation may be adjusted to take into account correction data 360.

Figure 4:
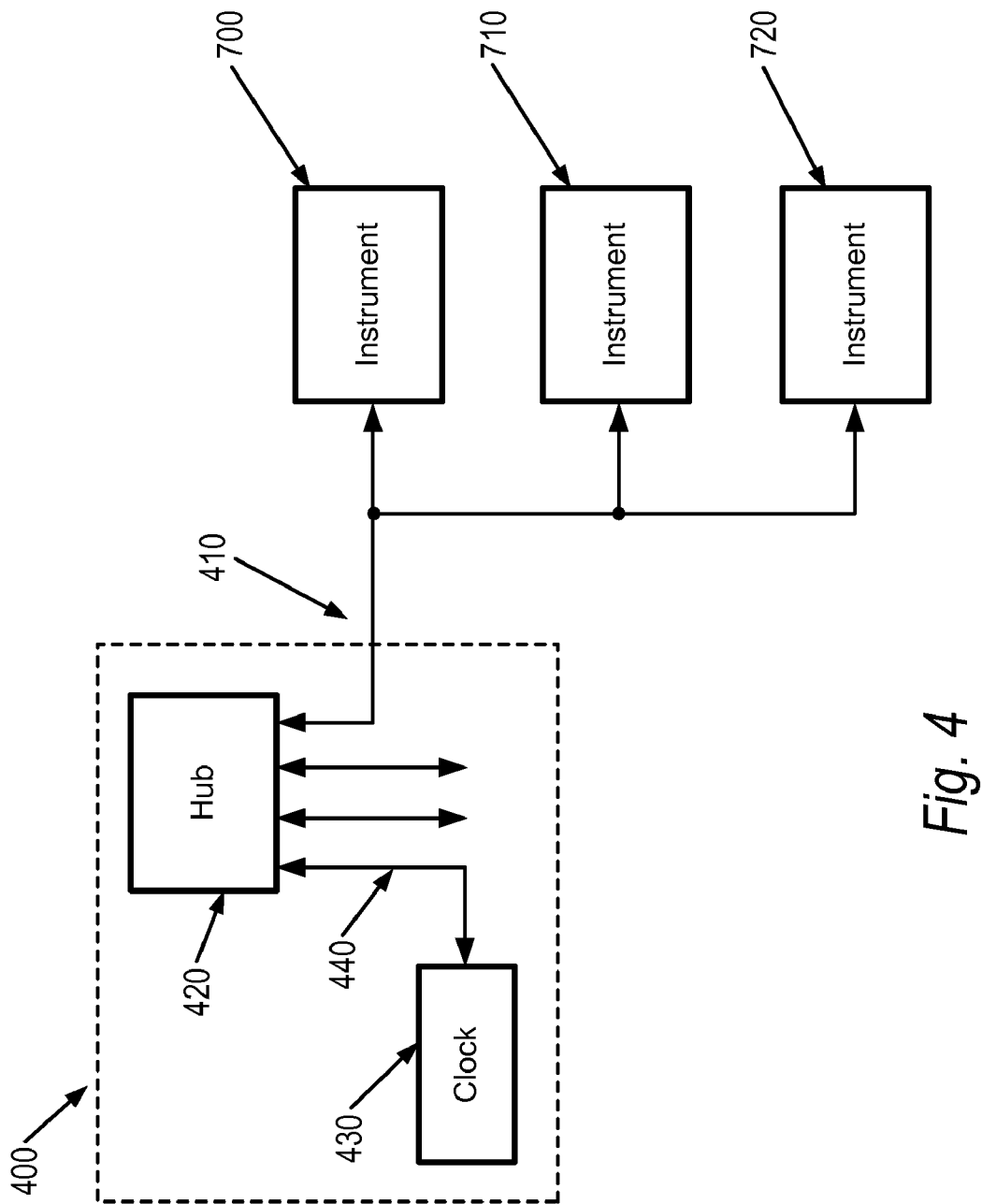
FIG. 4 shows an instrument with an external reference.

In a third embodiment of the invention as shown in FIG. 4, an arbitrary frequency reference is distributed via a network to one or more instruments and used to correct references in those instruments. Arbitrary frequency reference 430 generates interval information 440 which is processed by IEEE-1588 aware network interface 420 and made available over network 410. The IEEE 1588 standard allows for devices to select a master based on accuracy information published in network messages for each source. For arbitrary source 430 to insure it is used as the master in a network, it may be desirable to deliberately overstate the published accuracy of reference 430.

Figure 3:
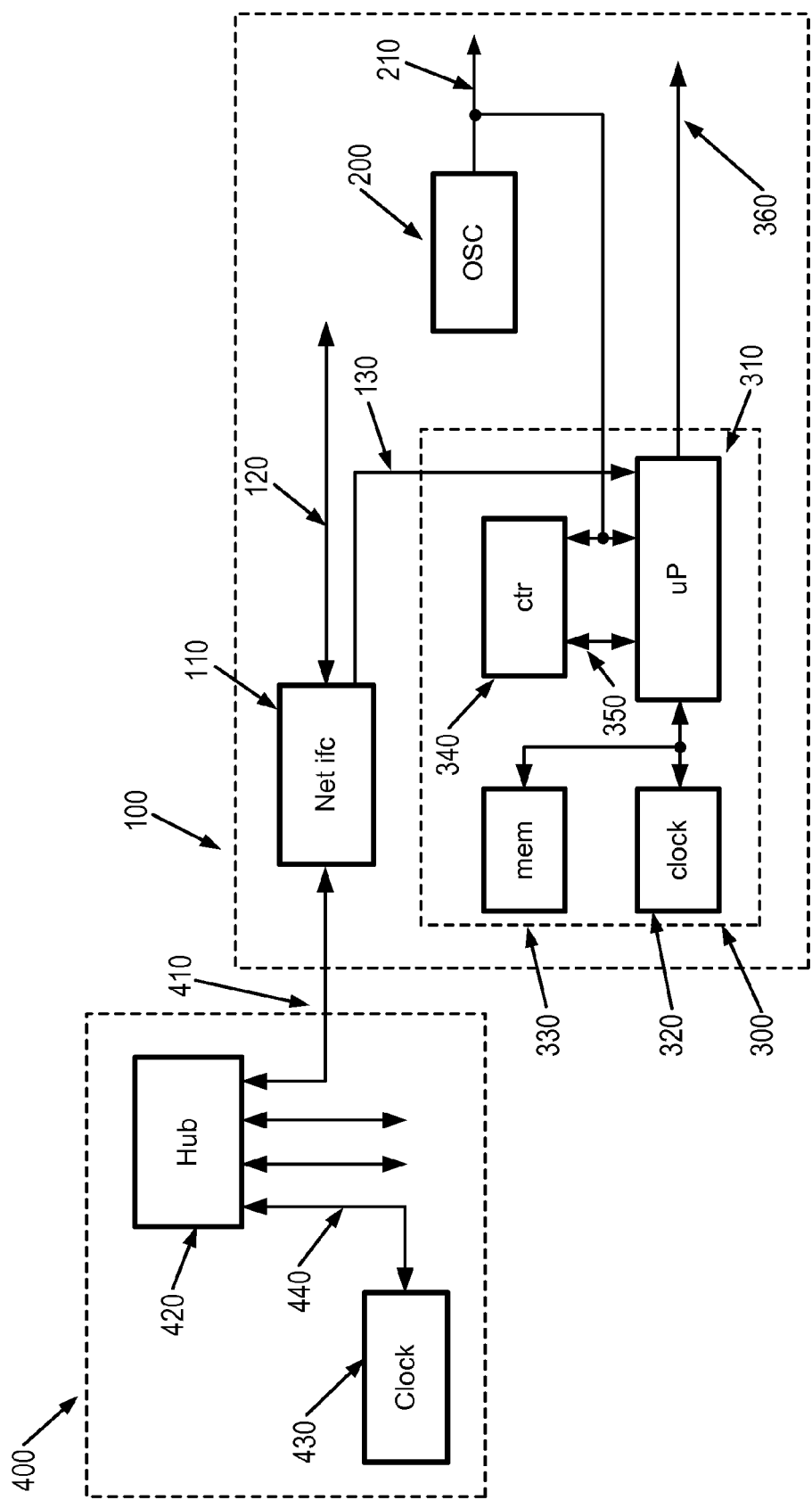
FIG. 3 shows a second embodiment of an instrument.

Instruments 700, 710, and 720 connect to network 410. These instruments operate in accordance with the embodiments of the invention as shown in FIGS. 1 through 3 to match their reference oscillators to the performance of arbitrary reference 430. Thus, frequency errors, frequency drift, and the like in reference 430 will be tracked in the operation of instruments 700, 710, and 720.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A network oscillator comprising:
a network interface for receiving precision time messages from a digital network and for using the time messages to produce precision time signals,
an oscillator producing a periodic output signal,
a processor converting the precision time signals to interval signals,
a counter gated by the interval signals and driven by the periodic output signal of the oscillator, and
the processor comparing the output of the counter to a predetermined value producing an error signal.

2. The network aware oscillator of claim 1 where the oscillator has a frequency control input and the error signal drives the frequency control input to correct the oscillator frequency.

3. The network aware oscillator of claim 2 where the error signal is an analog signal.

4. The network aware oscillator of claim 2 where the oscillator is a voltage controlled crystal oscillator.

5. The network aware oscillator of claim 2 where the oscillator is temperature stabilized.

6. The network aware oscillator of claim 2 where the oscillator is a YIG tuned oscillator.

7. The network aware oscillator of claim 2 where the oscillator is a dielectric resonant oscillator (DRO).

8. A network aware oscillator comprising:
a network interface for receiving precision time messages from a digital network and producing precision time signals using the precision time messages,
an oscillator producing a periodic output signal,
a processor converting the precision time signals to interval signals,
a counter gated by the interval signals and driven by the periodic output signal of the oscillator, and
the processor comparing the output of the counter to a predetermined value producing an error signal;
where the error signal is propagated to consumers of the oscillator output.

9. The network aware oscillator of claim 8 where the error signal is a digital signal.

10. The network aware oscillator of claim 2 where the error signal corrects for oscillator frequency error and oscillator aging.

11. A method of operating a network aware oscillator comprising:
receiving precision timing messages from a digital network,
using the precision timing messages to produce precision timing signals,
converting the precision timing signals to internal signals,
counting the output of an oscillator gated by the interval signals, and
generating an error signal from the comparison of the counter output with a predetermined value.

12. The method of claim 11 further comprising: driving a frequency control input of the oscillator using the error signal.

13. The method of claim 11 further comprising: temperature stabilizing the oscillator.

14. The method of claim 11 further comprising: propagating the error signal to consumers of the oscillator output.

15. The method of claim 11 further comprising:
generating a reference signal in an external reference oscillator,
generating precision timing signals from the reference oscillator, and
propagating the precision timing signals on the digital network.

16. The method of claim 15 wherein the reference oscillator is characterized by a true accuracy; the method further comprising publishing a network message on the digital network, indicating that the accuracy of the reference oscillator is higher than the true accuracy.

* * * * *

UNITED STATES PATENT AND TRADEMARK OFFICE
CERTIFICATE OF CORRECTION

PATENT NO. : 7,589,595 B2  Page 1 of 1
APPLICATION NO. : 11/465577
DATED : September 15, 2009
INVENTOR(S) : Robert T. Cutler It is certified that error appears in the above-identified patent and that said Letters Patent is hereby corrected as shown below:

On the Title Pg Item (57), under "Abstract", line 4, delete "which" and insert -- that --, therefor.

On the Title Pg Item (57), under "Abstract", line 8, after "signal" insert -- that --.

Signed and Sealed this

Twenty-fourth Day of August, 2010

David J. Kappos
*Director of the United States Patent and Trademark Office*